United States Patent
Kim et al.

(10) Patent No.: US 9,147,395 B2
(45) Date of Patent: Sep. 29, 2015

(54) MOBILE TERMINAL AND METHOD FOR RECOGNIZING VOICE THEREOF

(71) Applicant: LG ELECTRONICS INC., Seoul (KR)

(72) Inventors: Juhee Kim, Seoul (KR); Hyunseob Lee, Seoul (KR); Joonyup Lee, Seoul (KR); Jungkyu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 233 days.

(21) Appl. No.: 13/923,511

(22) Filed: Jun. 21, 2013

(65) Prior Publication Data

US 2014/0006027 A1 Jan. 2, 2014

(30) Foreign Application Priority Data

Jun. 28, 2012 (KR) .................. 10-2012-0070353

(51) Int. Cl.
  *G10L 15/32* (2013.01)
  *G10L 15/22* (2006.01)
  *H04M 1/27* (2006.01)
  *G10L 15/30* (2013.01)

(52) U.S. Cl.
  CPC ............. *G10L 15/22* (2013.01); *G10L 15/30* (2013.01); *G10L 15/32* (2013.01); *H04M 1/271* (2013.01); *G10L 2015/228* (2013.01)

(58) Field of Classification Search
  USPC .......................................... 704/230–257, 275
  See application file for complete search history.

(56) References Cited

U.S. PATENT DOCUMENTS

| | | | |
|---|---|---|---|
| 2002/0138274 A1 | 9/2002 | Sharma et al. | |
| 2002/0143551 A1 | 10/2002 | Sharma et al. | |
| 2003/0120486 A1 | 6/2003 | Brittan et al. | |
| 2006/0009980 A1 | 1/2006 | Burke et al. | |
| 2006/0122836 A1 | 6/2006 | Cross, Jr. et al. | |
| 2007/0276651 A1 | 11/2007 | Bliss et al. | |
| 2009/0271195 A1* | 10/2009 | Kitade et al. | 704/239 |
| 2010/0004930 A1 | 1/2010 | Strope et al. | |
| 2010/0169093 A1* | 7/2010 | Washio | 704/243 |
| 2011/0010177 A1* | 1/2011 | Nakano et al. | 704/257 |
| 2011/0066634 A1 | 3/2011 | Phillips et al. | |
| 2011/0131042 A1* | 6/2011 | Nagatomo | 704/240 |

(Continued)

FOREIGN PATENT DOCUMENTS

| | | |
|---|---|---|
| CN | 1786957 A | 6/2006 |
| CN | 102496364 A | 6/2012 |
| JP | 8-259125 A | 10/1996 |

(Continued)

*Primary Examiner* — Abul Azad
(74) *Attorney, Agent, or Firm* — Birch, Stewart, Kolasch & Birch, LLP

(57) ABSTRACT

The present disclosure relates to a mobile terminal and a voice recognition method thereof. The voice recognition method may include receiving a user's voice; providing the received voice to a first voice recognition engine provided in the server and a second voice recognition engine provided in the mobile terminal; acquiring first voice recognition data as a result of recognizing the received voice by the first voice recognition engine; acquiring second voice recognition data as a result of recognizing the received voice by the second voice recognition engine; estimating a function corresponding to the user's intention based on at least one of the first and the second voice recognition data; calculating a similarity between the first and the second voice recognition data when personal information is required for the estimated function; and selecting either one of the first and the second voice recognition data based on the calculated similarity.

16 Claims, 9 Drawing Sheets

(56) References Cited

U.S. PATENT DOCUMENTS

2011/0307254 A1 12/2011 Hunt et al.
2013/0238326 A1* 9/2013 Kim et al. .................... 704/231

FOREIGN PATENT DOCUMENTS

| | | |
|---|---|---|
| JP | 2004-272134 A | 9/2004 |
| JP | 2004-312210 A | 11/2004 |
| JP | 2005-284543 A | 10/2005 |
| JP | 2009-237439 A | 10/2009 |
| JP | 2010-14885 A | 1/2010 |
| KR | 10-2005-0001160 A | 1/2005 |
| KR | 10-2006-0089288 A | 8/2006 |
| WO | 2010/067118 A1 | 6/2010 |
| WO | WO 2014/004612 A1 | 1/2014 |

* cited by examiner

MOBILE TERMINAL AND METHOD FOR RECOGNIZING VOICE THEREOF

CROSS-REFERENCE TO RELATED APPLICATIONS

Pursuant to 35 U.S.C. §119(a), this application claims the benefit of earlier filing date and right of priority to Korean Application No. 10-2012-0070353, filed on Jun. 28, 2012, the contents of which are incorporated by reference herein in their entirety.

BACKGROUND OF THE INVENTION

1. Field of the Invention

The present disclosure relates to a mobile terminal, and more particularly, to a mobile terminal having a voice recognition function and a voice recognition method thereof.

2. Description of the Related Art

Terminals can be classified into mobile or portable terminals and a stationary terminals based on its mobility. Furthermore, the mobile terminals can be further classified into handheld terminals and vehicle mount terminals based on whether or not it can be directly carried by a user.

As it becomes multifunctional, for example, such a terminal is allowed to capture still images or moving images, play music or video files, play games, receive broadcast and the like, so as to be implemented as an integrated multimedia player. Moreover, the improvement of structural or software elements of the terminal may be taken into consideration to support and enhance the functions of the terminal.

For examples of the enhancement, a voice recognition function can be carried out using various algorithms in the mobile terminal. A lot of data computation amount and resources are required to implement a voice recognition function. Due to this, a distributed voice recognition system for realizing suitable resource distribution has been introduced. However, studies for enhancing the speediness and accuracy of its voice recognition result have been actively carried out even in such a distributed voice recognition system.

SUMMARY OF THE INVENTION

Accordingly, an objective of the present disclosure is to provide a mobile terminal capable of enhancing reliability for voice recognition results.

Another object of the present disclosure is to provide a mobile terminal capable of preventing the leak of personal information when performing a voice recognition function.

An embodiment of the present disclosure relates to a voice recognition method of a mobile terminal in connection with a server. The voice recognition method may include receiving a user's voice; providing the received voice to a first voice recognition engine provided in the server and a second voice recognition engine provided in the mobile terminal; acquiring first voice recognition data as a result of recognizing the received voice by the first voice recognition engine; acquiring second voice recognition data as a result of recognizing the received voice by the second voice recognition engine; estimating a function corresponding to the user's intention based on at least one of the first and the second voice recognition data; calculating a similarity between the first and the second voice recognition data when personal information is required for the estimated function; and selecting either one of the first and the second voice recognition data based on the calculated similarity.

According to an embodiment, the voice recognition method may further include ignoring the second voice recognition data when personal information is not required for the estimated function.

According to an embodiment, said acquiring the first voice recognition data may include transmitting a request signal for requesting the first voice recognition data to the server; and receiving the first voice recognition data from the server in response to the request signal.

According to an embodiment, the voice recognition method may further include obtaining the status information of a network connected between the server and the mobile terminal; and blocking the reception of the first voice recognition data based on the status information of the network. Furthermore, the voice recognition method may further include executing the estimated function using the second voice recognition data when the reception of the first voice recognition data is blocked.

According to an embodiment, the voice recognition method may further include displaying a menu button for executing the personal information protection function; and blocking the received voice from being provided to the first voice recognition engine when the personal information protection function is executed in response to a touch input to the menu button. Furthermore, the voice recognition method may further include executing the estimated function using the selected either one voice recognition data.

According to an embodiment, said acquiring the second voice recognition data may include recognizing the received voice with reference to a database for the personal information.

An embodiment of the present disclosure relates to a mobile terminal in connection with a server. The mobile terminal may include a microphone configured to receive a user's voice; a communication unit configured to transmit the received voice to the server and receive first voice recognition data generated as a result of recognizing the received voice by a first voice recognition engine provided in the server; a second voice recognition engine configured to generate second voice recognition data as a result of recognizing the received voice; and a controller configured to estimate a function corresponding to the user's intention based on at least one of the first and the second voice recognition data, and calculate a similarity between the first and the second voice recognition data when personal information is required for the estimated function, and select either one of the first and the second voice recognition data based on the calculated similarity.

According to an embodiment, the controller may ignore the second voice recognition data when personal information is not required for the estimated function.

According to an embodiment, the controller may obtain the status information of a network connected between the server and the mobile terminal, and block the reception of the first voice recognition data based on the status information of the network. Furthermore, the controller may execute the estimated function using the second voice recognition data when the reception of the first voice recognition data is blocked.

According to an embodiment, the mobile terminal may further include a display unit configured to display a menu button for executing the personal information protection function. Furthermore, the controller may block the received voice from being provided to the first voice recognition engine when the personal information protection function is executed in response to a touch input to the menu button.

According to an embodiment, the controller may execute the estimated function using the selected either one voice recognition data.

According to an embodiment, the second voice recognition engine may recognize the received voice with reference to a database for the personal information.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
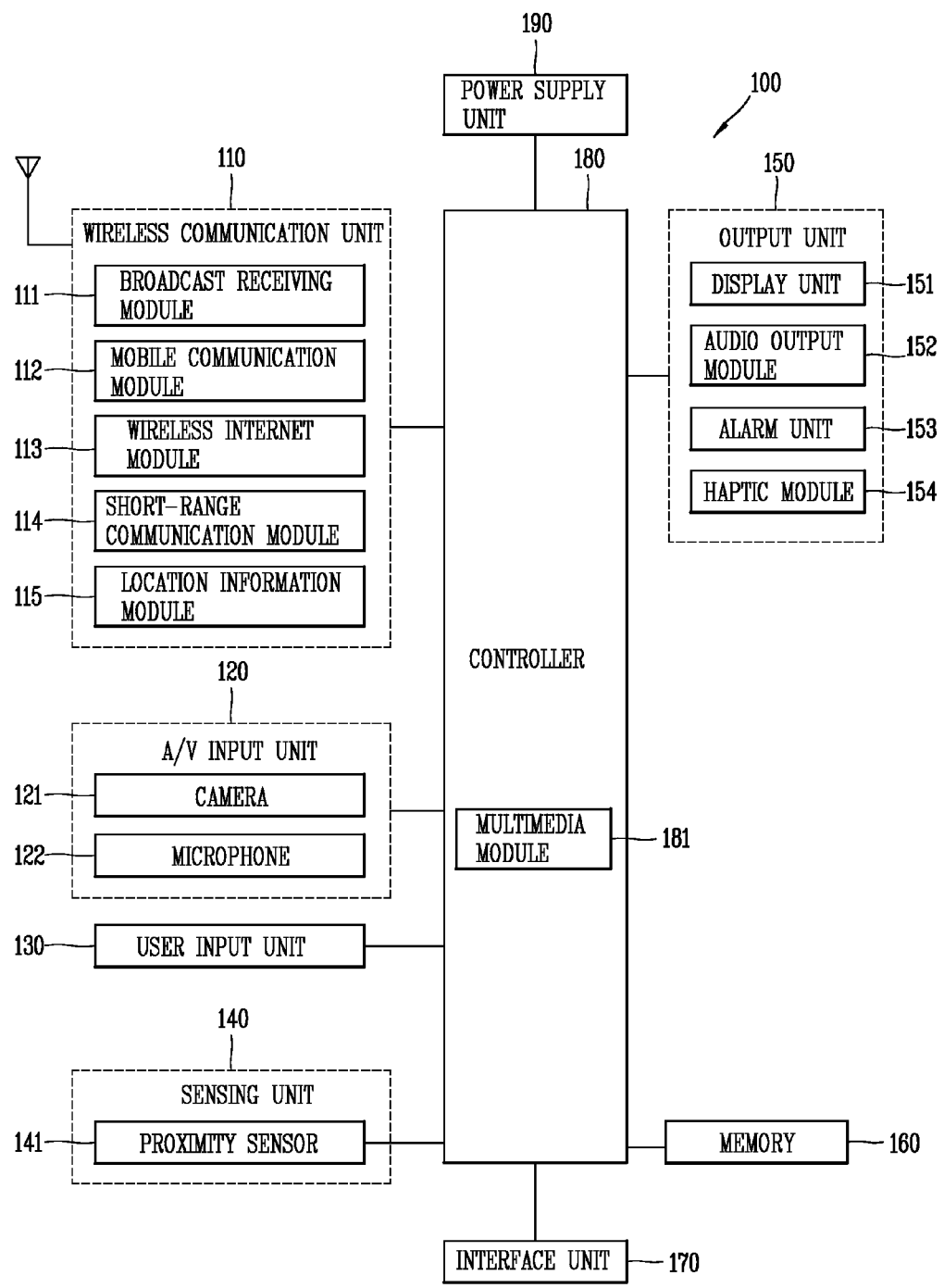
FIG. 1 is a block diagram illustrating a mobile terminal associated with an embodiment of the present disclosure.

Hereinafter, preferred embodiments of the present invention will be described in detail with reference to the accompanying drawings to such an extent that the present invention can be easily embodied by a person having ordinary skill in the art to which the present invention pertains. However, the present invention may be implemented in various different forms, and therefore, the present invention is not limited to the illustrated embodiments. In order to clearly describe the present invention, parts not related to the description are omitted, and like reference numerals designate like constituent elements throughout the specification.

A mobile terminal disclosed herein may include a portable phone, a smart phone, a laptop computer, a digital broadcast mobile device, a personal digital assistant (PDA), a portable multimedia player (PMP), a navigator, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 associated with the present disclosure. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the constituent elements 110-190 of the mobile terminal 100 will be described in sequence.

The wireless communication unit 110 may include one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast associated information may mean information regarding a broadcast channel, a broadcast program, a broadcast service provider, and the like. The broadcast associated information may also be provided through a mobile communication network. In this case, the broadcast associated information may be received by the mobile communication module 112. The broadcast signal and broadcast-associated information received through the broadcast receiving module 111 may be stored in the memory 160.

The mobile communication module 112 transmits and/or receives a radio signal to and/or from at least one of a base station, an external terminal and a server over a mobile communication network. The radio signal may include a voice call signal, a video call signal or various types of data according to text and/or multimedia message transmission and reception.

The wireless Internet module 113 as a module for supporting wireless Internet access may be built-in or externally installed to the mobile terminal 100. A variety of wireless Internet access techniques may be used, such as WLAN (Wireless LAN), Wi-Fi, Wibro (Wireless Broadband), Wimax (World Interoperability for Microwave Access), HSDPA (High Speed Downlink Packet Access), and the like.

The short-range communication module 114 refers to a module for supporting a short-range communication. A variety of short-range communication technologies may be used, such as Bluetooth, Radio Frequency IDentification (RFID), Infrared Data Association (IrDA), Ultra WideBand (UWB), ZigBee, and the like.

The location information module 115 is a module for acquiring a location of the mobile terminal 100, and there is a GPS module as a representative example.

Subsequently, referring to FIG. 1, the A/V (audio/video) input unit 120 receives an audio or video signal, and the A/V (audio/video) input unit 120 may include a camera 121, a microphone 122, and the like. The camera 121 processes an image frame, such as still or moving images, obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated during the process of receiving the external audio signal.

The user input unit 130 may generate input data to control an operation of the mobile terminal 100. The user input unit 130 may be configured with a keypad, a dome switch, a touch pad (pressure/capacitance), a jog wheel, a jog switch, and the like.

The sensing unit 140 detects presence or absence of the user's contact, and a current status of the mobile terminal 100 such as an opened or closed configuration, a location of the mobile terminal 100, an orientation of the mobile terminal 100, an acceleration or deceleration of the mobile terminal 100, and the like, and generates a sensing signal for controlling the operation of the mobile terminal 100. For example, when the mobile terminal 100 is a slide phone type, the sensing unit 140 may sense an opened or closed configuration of the slide phone. Furthermore, the sensing unit 140 may sense whether or not power is supplied from the power supply unit 190, or whether or not an external device is coupled to the interface unit 170.

The sensing unit 140 may include a proximity sensor 141. Furthermore, the sensing unit 140 may include a touch sensor (not shown) for sensing a touch operation with respect to the display unit 151.

The touch sensor may be implemented as a touch film, a touch sheet, a touch pad, and the like. The touch sensor may be configured to convert changes of a pressure applied to a specific part of the display unit 151, or a capacitance generated from a specific part of the display unit 151, into electric input signals. The touch sensor may be configured to sense not only a touched position and a touched area, but also a touch pressure.

When the touch sensor and display unit 151 forms an interlayer structure, the display unit 151 may be used as an input device rather than an output device. The display unit 151 may be referred to as a "touch screen".

When there is a touch input through the touch screen, the corresponding signals may be transmitted to a touch controller (not shown). The touch controller processes signals transferred from the touch sensor, and then transmits data corresponding to the processed signals to the controller 180. Accordingly, the controller 180 may sense which region of the display unit 151 has been touched.

When the touch screen is a capacitance type, the proximity of a sensing object may be detected by changes of an electromagnetic field according to the proximity of a sensing object. The touch screen may be categorized into a proximity sensor 141.

The proximity sensor 141 refers to a sensor for detecting the presence or absence of a sensing object using an electromagnetic field or infrared rays without a mechanical contact. The proximity sensor 141 has a longer lifespan and more enhanced utility than a contact sensor. The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like.

Hereinafter, for the sake of convenience of brief explanation, a behavior of closely approaching the touch screen without contact will be referred to as "proximity touch", whereas a behavior that the pointer substantially comes in contact with the touch screen will be referred to as "contact touch".

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The output unit 150 may generate an output related to visual, auditory, tactile senses. The output unit 150 may include a display unit 151, an audio output module 152, an alarm unit 153, a haptic module 154, and the like.

The display unit 151 may display (output) information processed in the mobile terminal 100. For example, when the mobile terminal 100 is operated in a phone call mode, the display unit 151 may display a user interface (UI) or graphic user interface (GUI) related to a phone call. When the mobile terminal 100 is operated in a video call mode or image capturing mode, the display unit 151 may display a captured image, a received image, UI, GUI, or the like.

The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

At least one of those displays (or display devices) included in the display unit 151 may be configured with a transparent or optical transparent type to allow the user to view the outside therethrough. It may be referred to as a transparent display. A representative example of the transparent display may be a transparent OLED (TOLED), and the like. The rear structure of the display unit 151 may be also configured with an optical transparent type. Under this configuration, the user can view an object positioned at a rear side of the mobile device body through a region occupied by the display unit 151 of the mobile device body.

There may exist two or more display units 151 according to the implementation of the mobile terminal 100. For example, a plurality of the display units 151 may be placed on one surface in a separate or integrated manner, or may be place on different surfaces, respectively.

The audio output module 152 may output audio data received from the wireless communication unit 110 or stored in the memory 160, in a call-receiving mode, a call-placing mode, a recording mode, a voice selection mode, a broadcast reception mode, and the like. The audio output module 152 may output an audio signal related to a function carried out in the mobile terminal 100 (for example, sound alarming a call received or a message received, and the like). The audio output module 152 may include a receiver, a speaker, a buzzer, and the like.

The alarm unit 153 outputs signals notifying the occurrence of an event from the mobile terminal 100. The examples of an event occurring from the mobile terminal 100 may include a call received, a message received, a key signal input, a touch input, and the like. The alarm unit 153 may output not only video or audio signals, but also other types of signals such as signals for notifying the occurrence of an event in a vibration manner. Since the video or audio signals may be also output through the display unit 151 or the audio output unit 152, the display unit 151 and the audio output module 152 may be categorized into part of the alarm unit 153.

The haptic module 154 generates various tactile effects that can be felt by the user. A representative example of the tactile effects generated by the haptic module 154 may include vibration. Vibration generated by the haptic module 154 may have a controllable intensity, a controllable pattern, and the like. For example, different vibrations may be output in a synthesized manner or in a sequential manner.

The haptic module 154 may generate various tactile effects, including not only vibration, but also arrangement of pins vertically moved with respect to a skin surface being touched, air injection force or air suction force through an injection port or suction port, touch by a skin surface, contact with an electrode, effects by stimulus such as an electrostatic force, reproduction of cold or hot feeling using a heat absorbing device or heat emitting device, and the like.

The haptic module 154 may be configured to transmit tactile effects through the user's direct contact, or the user's muscular sense using a finger or a hand. Two or more haptic modules 154 may be provided according to the configuration of the mobile terminal 100.

The memory 160 may store a program for operating the controller 180, or temporarily store input/output data (for example, phonebooks, messages, still images, moving images, and the like). The memory 160 may store data related to various patterns of vibrations and sounds outputted when performing a touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

The interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing related to telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize a handwriting or drawing input on the touch screen as text or image.

The power supply unit 190 may receive external or internal power to provide power required by various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Hereinafter, the method of processing a user input to the mobile terminal 100 will be described.

The user input unit 130 is manipulated to receive a command for controlling the operation of the mobile terminal 100, and may include a plurality of manipulation units. The manipulation units may be commonly designated as a manipulating portion, and any method may be employed if it is a tactile manner allowing the user to perform manipulation with a tactile feeling.

Various kinds of visual information may be displayed on the display unit 151. The visual information may be displayed in the form of a character, a numeral, a symbol, a graphic, an icon, and the like. For an input of the visual information, at least one of a character, a numeral, a symbol, a graphic, and an icon may be displayed with a predetermined arrangement so as to be implemented in the form of a keypad. Such a keypad may be referred to as a so-called "soft key."

The display unit 151 may operate on an entire region or operate by dividing into a plurality of regions. In case of the latter, the plurality of regions may be configured to operate in an associative way. For example, an output window and an input window may be displayed on the upper and lower portions of the display unit 151, respectively. The output window and the input window may be regions allocated to output or input information, respectively. A soft key on which numerals for inputting a phone number or the like are displayed is outputted on the input window. When the soft key is touched, a numeral corresponding to the touched soft key is displayed on the output window. When the first manipulating unit is manipulated, a phone call connection for the phone number displayed on the output window will be attempted or a text displayed on the output window will be entered to the application.

The display unit 151 or touch pad may be configured to sense a touch scroll. The user may move an object displayed on the display unit 151, for example, a cursor or pointer placed on an icon or the like, by scrolling the display unit 151 or touch pad. Moreover, when a finger is moved on the display unit 151 or touch pad, a path being moved by the finger may be visually displayed on the display unit 151. It may be useful to edit an image displayed on the display unit 151.

In order to cope with a case where the display unit 151 and touch pad are touched together within a predetermined period of time, one function of the terminal 100 may be implemented. For the case of being touched together, there is a case when the user clamps a body of the mobile terminal 100 using his or her thumb and forefinger. For one of the above functions implemented in the mobile terminal 100, for example, there may be an activation or de-activation for the display unit 151 or touch pad.

Figure 2A:
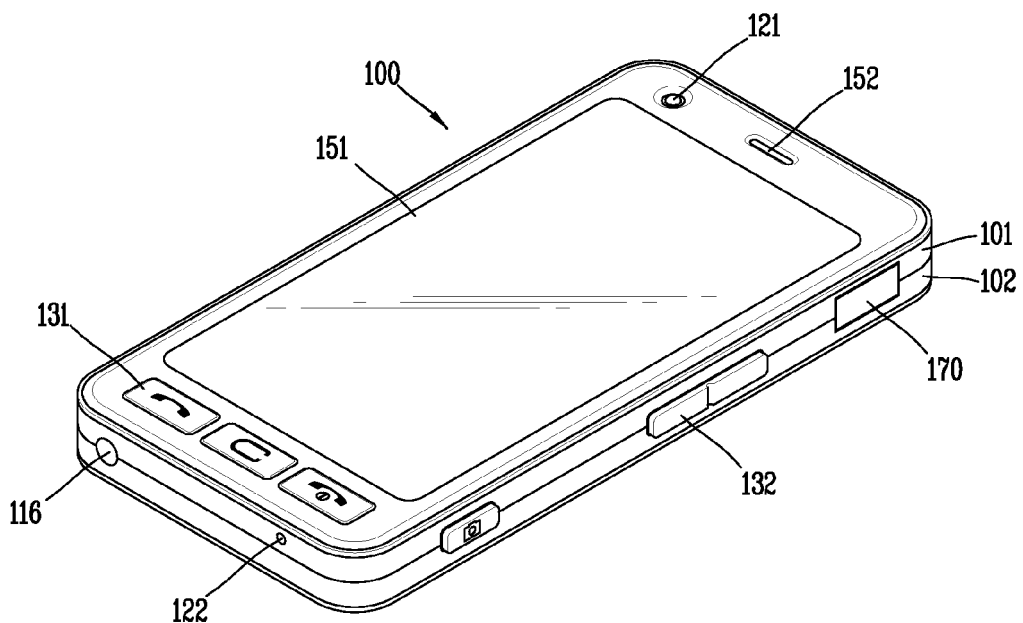
FIGS. 2A and 2B are perspective views illustrating an external appearance of the mobile terminal associated with the present disclosure.
Figure 2B:
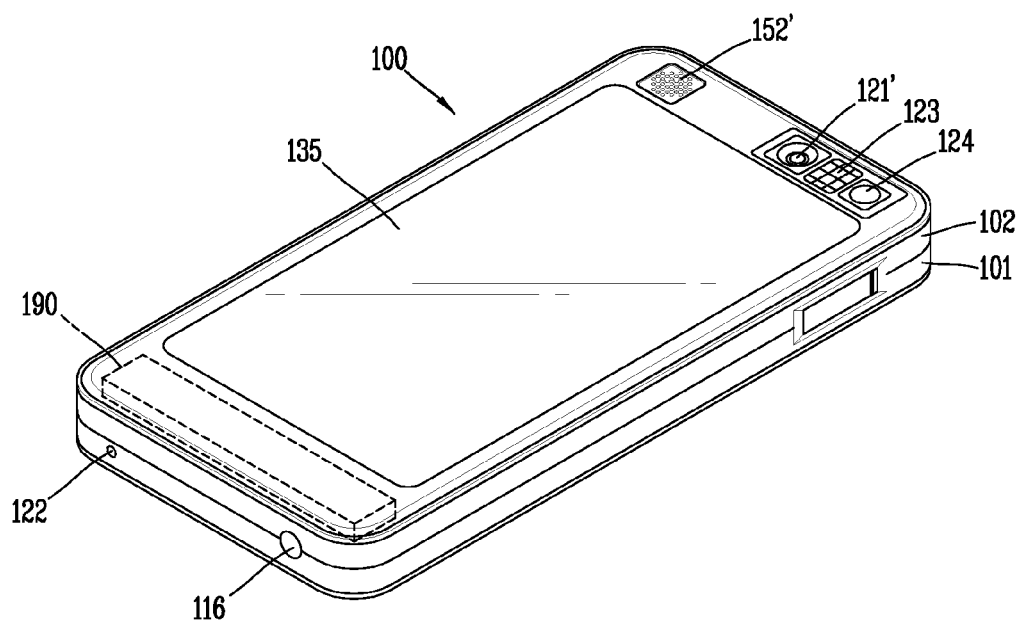

FIGS. 2A and 2B are perspective views illustrating the external appearance of a mobile terminal 100 related to the present disclosure. FIG. 2A is a front and a side view illustrating the mobile terminal 100, and FIG. 2B is a rear and the other side view illustrating the mobile terminal 100.

Referring to FIG. 2A, the mobile terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal. In this embodiment, the case may be divided into a front case 101 and a rear case 102. Various electronic components may be integrated in a space formed between the front case 101 and the rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130 (refer to FIG. 1), a microphone 122, an interface 170, and the like may be arranged on the terminal body, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102.

The user input unit 130 is manipulated to receive a command for controlling the operation of the portable terminal 100. The user input unit 130 may include a plurality of manipulation units 131, 132.

The first and the second manipulation unit 131, 132 may receive various commands. For example, the first manipulation unit 131 may be used to receive a command, such as start, end, scroll, or the like. The second manipulation unit 132 may be used to receive a command, such as controlling a volume level being outputted from the audio output unit 152, or switching it into a touch recognition mode of the display unit 151.

Referring to FIG. 2B, a camera 121' may be additionally mounted on a rear surface of the terminal body, namely, the rear case 102. The rear camera 121' has an image capturing direction, which is substantially opposite to the direction of the front camera 121 (refer to FIG. 2A), and may have different number of pixels from those of the front camera 121.

For example, the front camera 121 may be configured to have a relatively small number of pixels, and the rear camera 121' may be configured to have a relatively large number of pixels. Accordingly, in case where the front camera 121 is used for video communication, it may be possible to reduce the size of transmission data when the user captures his or her own face and sends it to the other party in real time. On the other hand, the rear camera 121' may be used for the purpose of storing high quality images.

On the other hand, the cameras 121, 121' may be provided in the terminal body in a rotatable and popupable manner.

A flash 123 and a mirror 124 may be additionally disposed adjacent to the rear camera 121'. The flash 123 illuminates light toward an object when capturing the object with the camera 121'. The mirror 124 allows the user to look at his or her own face, or the like, in a reflected way when capturing himself or herself (in a self-portrait mode) by using the rear camera 121'.

A rear audio output unit 152' may be additionally disposed on a rear surface of the terminal body. The rear audio output unit 152' together with the front audio output unit 152 (refer to FIG. 2A) can implement a stereo function, and it may be also used to implement a speaker phone mode during a phone call.

An antenna 116 for receiving broadcast signals may be additionally disposed on a lateral surface of the terminal body. The antenna 116 constituting part of a broadcast receiving module 111 (refer to FIG. 1) may be provided so as to be pulled out from the terminal body.

A power supply unit 190 for supplying power to the portable terminal 100 may be mounted on the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be also configured with an optical transmission type, similarly to the display unit 151 (refer to FIG. 2A). Alternatively, a rear display unit for displaying visual information may be additionally mounted on the touch pad 135. At this time, information displayed on the both surfaces of the front display unit 151 and rear display unit may be controlled by the touch pad 135.

The touch pad 135 may be operated in conjunction with the display unit 151 of the front case 101. The touch pad 135 may be disposed in parallel at a rear side of the display unit 151. The touch pad 135 may have the same size as or a smaller size than the display unit 151.

Figure 3:
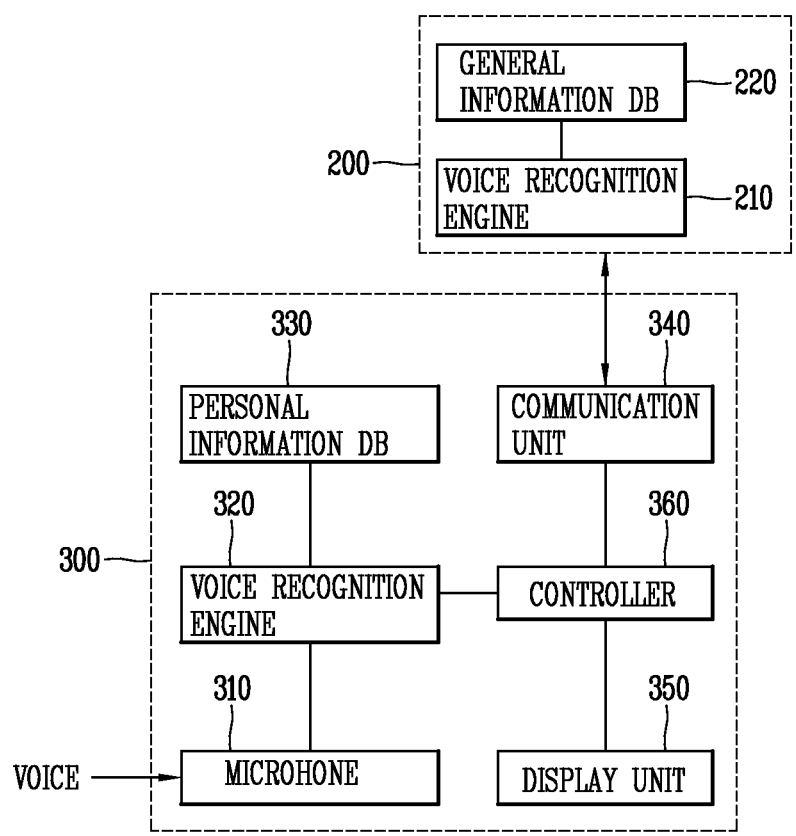
FIG. 3 is a block diagram illustrating a voice recognition system according to an embodiment of the present disclosure.

FIG. 3 is a block diagram illustrating a voice recognition system according to an embodiment of the present disclosure. Referring to FIG. 3, the voice recognition system may include a server 200 and a mobile terminal 300 connected to each other through a network to process voice recognition using distributed resources. In other words, the voice recognition system may implement a distributed voice recognition technology.

The server 200 may include a first voice recognition engine 210 and a first database 220. The first voice recognition engine 210 may recognize a voice provided by the mobile terminal 300 with reference to the first database 220 in which the information domain is specified with general information. As a result, the first voice recognition engine 210 may generate first voice recognition data. The server 200 may transmit first voice recognition data generated by the first voice recognition engine 210 to the mobile terminal 300.

The mobile terminal 300 may include a microphone 310, a second voice recognition engine 320, a second database 330, a communication unit 340, a display unit 350, and a controller 360. The microphone 310 may receive the user's voice. The second voice recognition engine 320 may recognize a voice received through the microphone 310 with reference to the second database 330 in which the information domain is specified with personal information. As a result, the second voice recognition engine 320 may generate second voice recognition data. The communication unit 340 may transmit the received voice to the server 200 through the microphone 310, and receive first voice recognition data from the server in response thereto. The display unit 350 may display various information and control menus associated with voice recognition. The controller 360 may control the overall operation of the mobile terminal associated with voice recognition.

Hereinafter, the voice recognition processing of the first and the second voice recognition engine 210, 310 will be described in detail. For the sake of convenience of explanation, the first and the second voice recognition engine 210, 310 are commonly referred to as a voice recognition engine, and the first and the second database 220, 330 are commonly referred to as a database, and the first and the second voice recognition data are commonly referred to as voice recognition data.

The voice recognition engine analyzes the meaning and context of a voice received (entered) using a voice recognition algorithm in the information domain of a database. To this end, a voice may be converted into data in a text form using a speech-to-text (STT) algorithm and stored in the database.

The user's voice may be converted into a plurality of data using a voice recognition algorithm. In this case, the voice recognition engine may determine recognition rates for the plurality of data, and select data having the highest recognition rate among the plurality of data as a voice recognition result.

Figure 4:
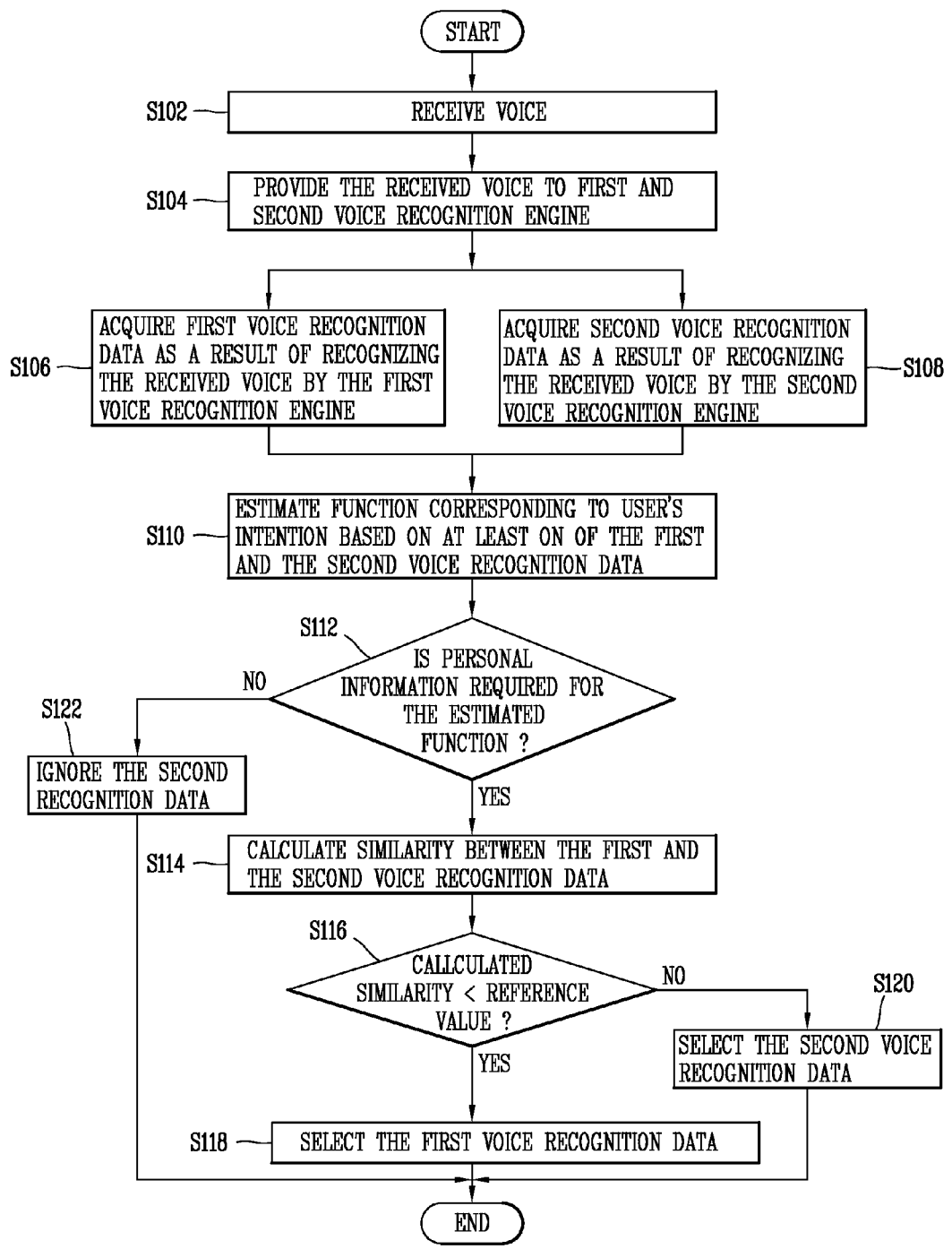
FIG. 4 is a flow chart for explaining a voice recognition method of a mobile terminal according to an embodiment of the present disclosure.

FIG. 4 is a flow chart for explaining a voice recognition method of a mobile terminal 300 according to an embodiment of the present disclosure. Referring to FIG. 4, the process (S102) of receiving the user's voice through the microphone 310 is carried out.

Next, the process (S104) of providing the received voice to the first voice recognition engine 210 and second voice recognition engine 320 is carried out. The voice may be transmitted to the server 200 through the microphone 310 and provided to the first voice recognition engine 210. At this time, voice transmission to the server 200 may be blocked according to the network status.

Then, the process (S106) of acquiring first voice recognition data as a result of recognizing the voice by the first voice recognition engine is carried out. The first voice recognition data may be received from the server 200. At this time, voice recognition from the server 200 may be blocked according to the network status. Furthermore, the process (S108) of acquiring second voice recognition data as a result of recognizing a voice by the second voice recognition engine 320 is carried out.

Next, the process (S110) of estimating a function corresponding to the user's intention based on at least one of the first and the second voice recognition data is carried out. For example, a function corresponding to the user's intention may be estimated by spoken language understanding (SLU) work. The SLU work refers to extracting meaningful information from a voice recognized sentence to deduce the user's intention, mainly, extracting information such as main action, speech act, named entity, and the like. Here, the main act denotes what is a specific action desired to taken by the user, which is revealed in the user's utterance, and the speech act denotes keyword information such as person, place, organization, time, and the like.

Next, the process (S112) of determining whether or not personal information (for example, contact information, etc.) is required for the estimated function is carried out. For example, personal information for a call object is required to execute a phone call function. When personal information is required for the estimated function, the process (S114) of calculating a similarity between the first and the second voice recognition data when personal information is required for the estimated function is carried out. Here, the similarity can express a rate at which the number of characters or words coincident with each other within texts being compared to each other. For example, when "ABCD" is compared to "ABCF", three of the four characters are the same but one is different, and thus its similarity can be calculated as 75%.

Then, the process (S116) of comparing the calculated similarity with a predetermined reference value (for example, 80%) is carried out. When the calculated similarity is less than the reference value, namely, when it is determined that there is a large difference between the first and the second voice recognition data, the process (S118) of selecting the first voice recognition data from the first and the second voice recognition data is carried out. Accordingly, the selected first voice recognition data may be used to execute the estimated function. At this time, the estimated function may be modified or complemented by the selected first voice recognition data for its execution.

On the contrary, when the calculated similarity is equal to or greater than the reference value, namely, when it is determined that there is a small difference between the first and the second voice recognition data, the process (S120) of selecting the second voice recognition data from the first and the second voice recognition data is carried out. Accordingly, the selected second voice recognition data may be used to execute the estimated function. At this time, the estimated function may be modified or complemented by the selected second voice recognition data for its execution.

On the other hand, the process (S122) of ignoring the second voice recognition data is carried out when personal information is not required for the estimated function. Accordingly, the first voice recognition data may be used to execute the estimated function.

As described above, according to the present disclosure, among voice recognition results obtained by a remote voice recognition engine (first voice recognition engine) and a local voice recognition engine (second voice recognition engine, which are complementary to each other, a voice recognition result determined to have high reliability by a predetermined algorithm may be selected and used, thereby enhancing a voice recognition rate of the mobile terminal 300.

Furthermore, according to the present disclosure, when personal information is required for the estimated function during the voice recognition process, a voice recognition result obtained by the local voice recognition engine may be used, thereby preventing a voice associated with personal information from being recognized by the remote voice recognition engine. In other words, it may be possible to prevent personal information from being leaked.

Furthermore, according to the present disclosure, a voice recognition result of the remote voice recognition engine can be ignored during the fault status of a network to remove a delay required to receive a voice recognition result from the remote voice recognition engine, thereby enhancing the processing speed of voice recognition.

Figure 5:
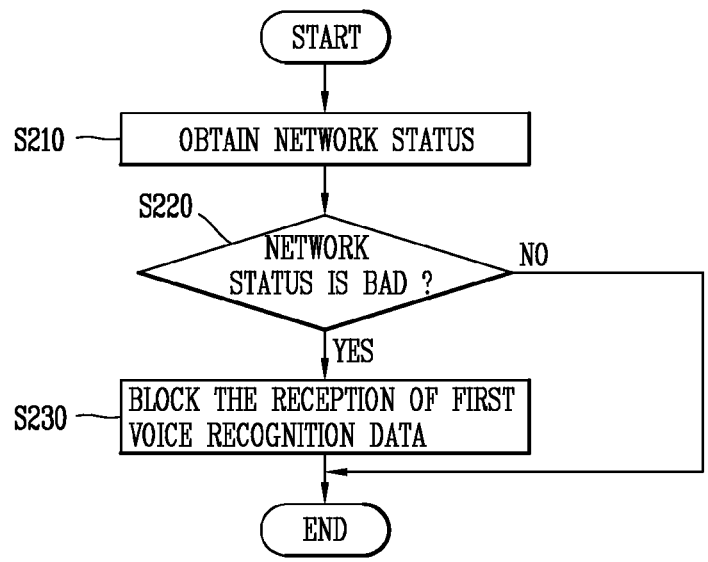
FIGS. 5 and 6 are flow charts for explaining a voice recognition method of a mobile terminal associated with whether or not voice recognition data is received according to an embodiment of the present disclosure.
Figure 6:
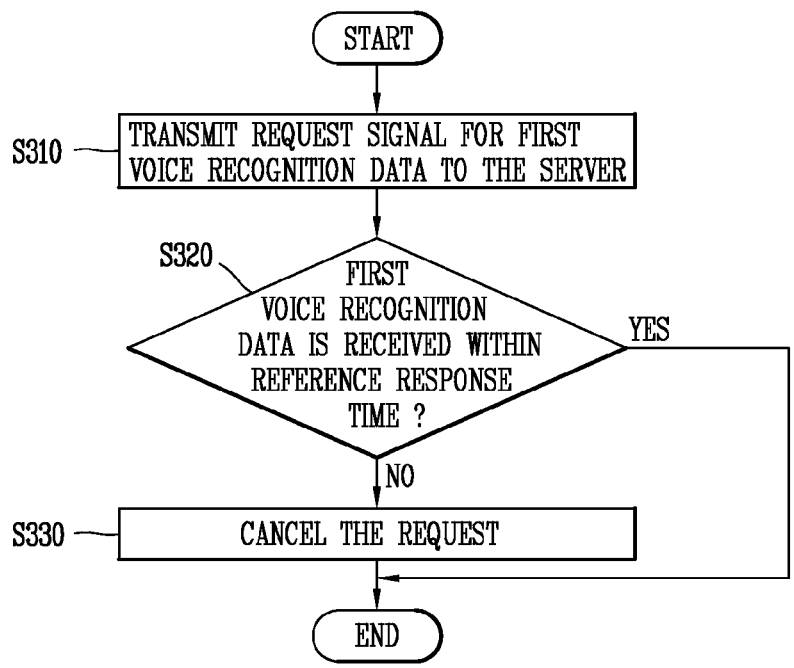

FIGS. 5 and 6 are flow charts for explaining a voice recognition method of a mobile terminal 300 associated with whether or not voice recognition data is received according to an embodiment of the present disclosure.

Referring to FIG. 5, first, the process (S210) of obtaining the status of a network established between the server 200 and the mobile terminal 300 is carried out. The status of a network may be obtained based on transmission speed, data packet loss rate, and the like.

Then, the process (S220) of determining whether the status of a network is bad or not is carried out. When the network status is bad, the process (S230) of blocking the first voice recognition data from being received from the server 200 is carried out.

Referring to FIG. 6, first, the process (S310) of transmitting a request signal for the first voice recognition data to the server 200 is carried out. The first voice recognition data may be received from the server 200 in response to the request signal.

Next, the process (S320) of determining whether or not the first voice recognition data is received within a predetermined response time is carried out. When the first voice recognition data is not received within a predetermined response time, the process (S330) of transmitting a cancel signal for cancelling a request for the first voice recognition data to the server is carried out. The server 200 may terminate the generation and transmission of the first voice recognition data according to the cancel signal.

Figure 7:
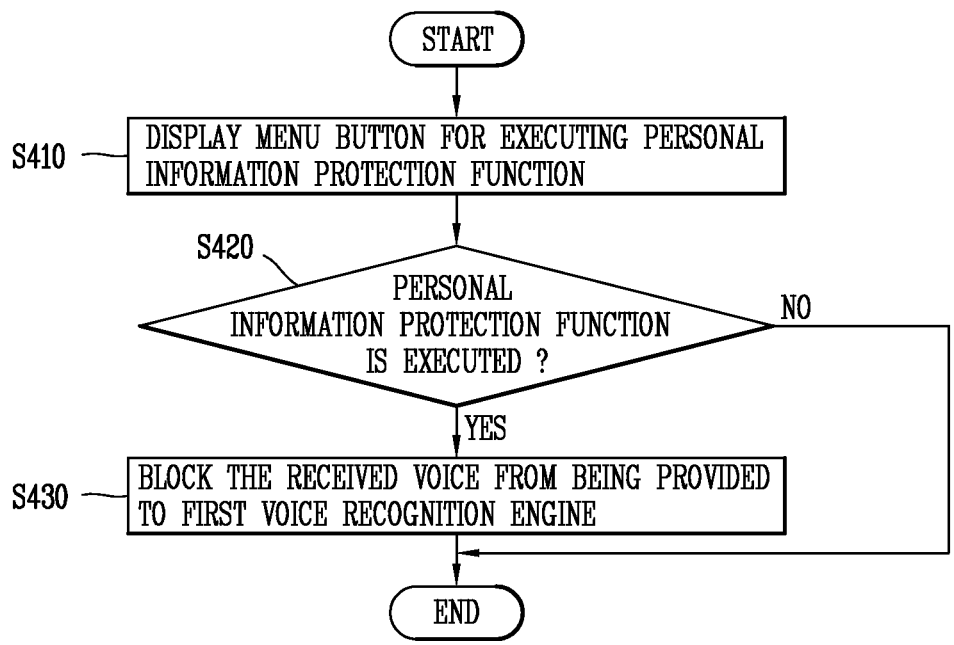
FIG. 7 is a flow chart for explaining a voice recognition method of a mobile terminal associated with a personal information protection function according to an embodiment of the present disclosure.

FIG. 7 is a flow chart for explaining a voice recognition method of a mobile terminal 300 associated with a personal information protection function according to an embodiment of the present disclosure. Referring to FIG. 7, the process (S410) of displaying a menu button for executing a personal information protection function in a voice recognition mode is carried out. The personal information protection function may be executed in response to a touch input to the menu button.

Next, the process (S420) of determining whether or not to execute a personal information protection function is carried out. When the personal information protection function is executed, it may be possible to block a voice received from the user from being provided to the first voice recognition engine 210. It means blocking the user's voice from being transmitted to the server 200.

Figure 8:
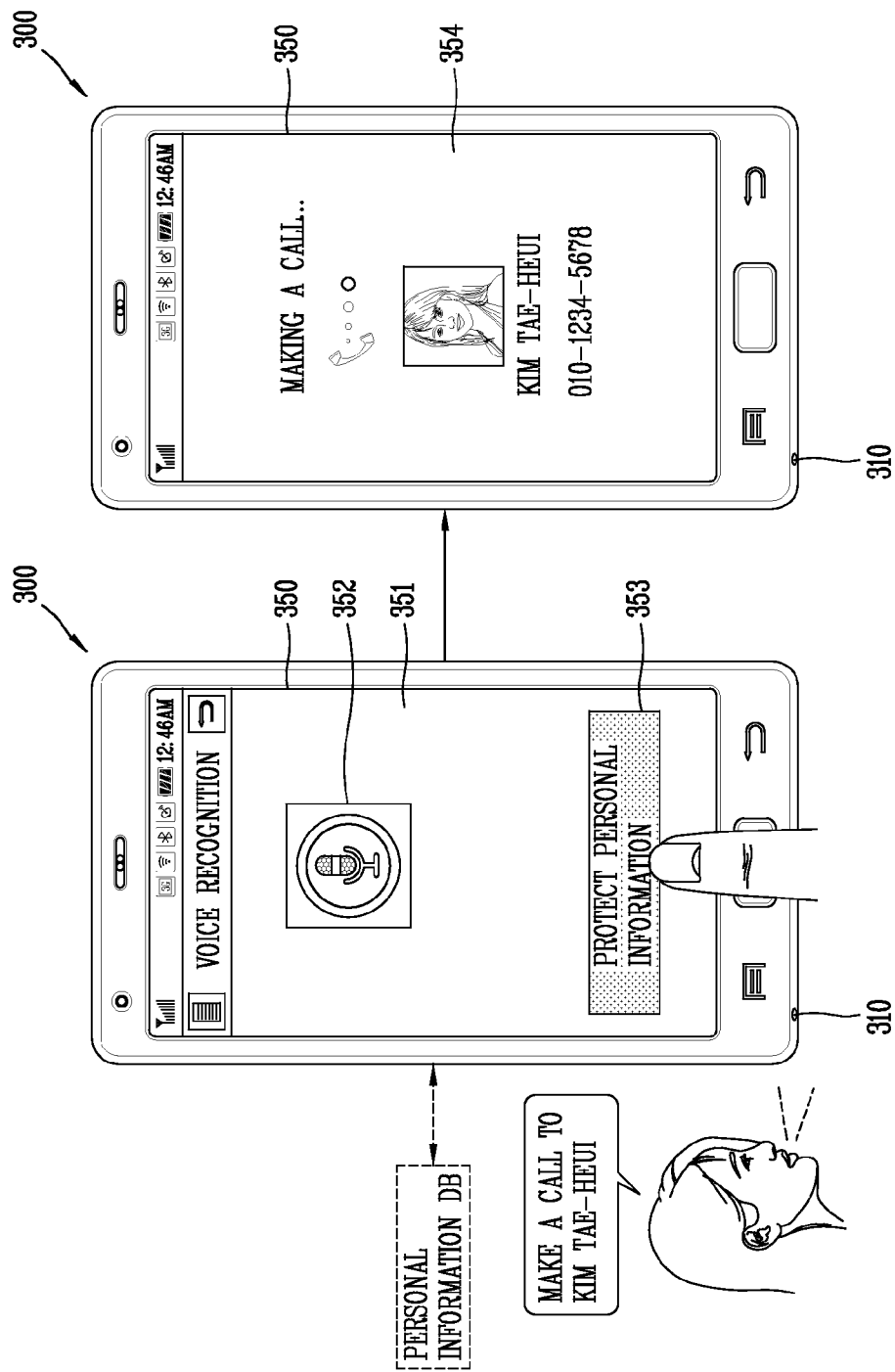
FIG. 8 is a conceptual view illustrating a user interface of a mobile terminal to which the voice recognition method of FIG. 7 is applied.

FIG. 8 is a conceptual view illustrating a user interface of a mobile terminal 300 to which the voice recognition method of FIG. 7 is applied. Referring to FIG. 8, the controller 360 can control the display unit 350 to display a screen image 351 associated with voice recognition. The screen image 351 may include guide information 352 indicating that a voice recognition mode is being executed, a menu button 353 for executing a personal information protection function, and the like.

When a touch input to the 353 is sensed, the controller 360 may execute a personal information protection function. When the user's voice is received through the microphone 310 during the execution of a personal information protection function, the controller 360 may block the received voice from being provided to the first voice recognition engine 210, and provide it to the second voice recognition engine 320.

The second voice recognition engine 320 may recognize the received voice with reference to the first database 220 in which the information domain is specified with personal information, and transfer the voice recognition result to the controller 360. The controller 360 may estimate and execute a function corresponding to the user's intention based on the voice recognition result of the second voice recognition engine 320. For example, as a voice "Make a call to Kim Tae-Heui" received from the user is recognized, the controller 360 may estimate and execute a phone call function. Further- more, the controller 360 may control the display unit 350 to display a screen image 354 associated with the phone call function.

However, in order to perform a phone call function, the contact information of "Kim Tae-Heui" is required as personal information. In this case, a personal information protection function may be manually executed using the menu button 353 not to transmit a voice associated with personal information to the server 200.

Figure 9:
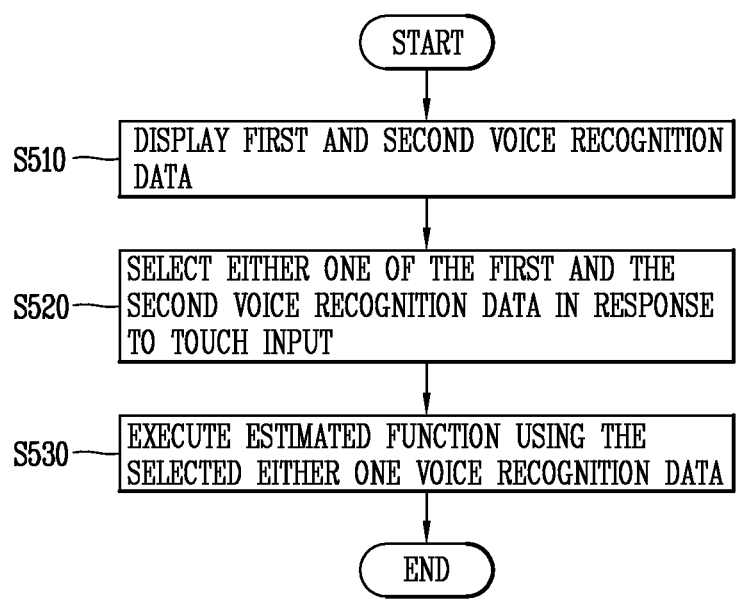
FIG. 9 is a flow chart for explaining a voice recognition method of a mobile terminal associated with the user's selection for voice recognition data according to an embodiment of the present disclosure.

FIG. 9 is a flow chart for explaining a voice recognition method of a mobile terminal 300 associated with the user's selection for voice recognition data according to an embodiment of the present disclosure. Referring to FIG. 9, the process (S510) of displaying first and second voice recognition data as a result of the voice recognition of the first and the second voice recognition engine 210, 310 is carried out.

Next, the process (S520) of selecting either one of the first and the second voice recognition data in response to a touch input is carried out. Then, the process (S530) of using the selected either one voice recognition data and executing the estimated function is carried out.

Figure 10:
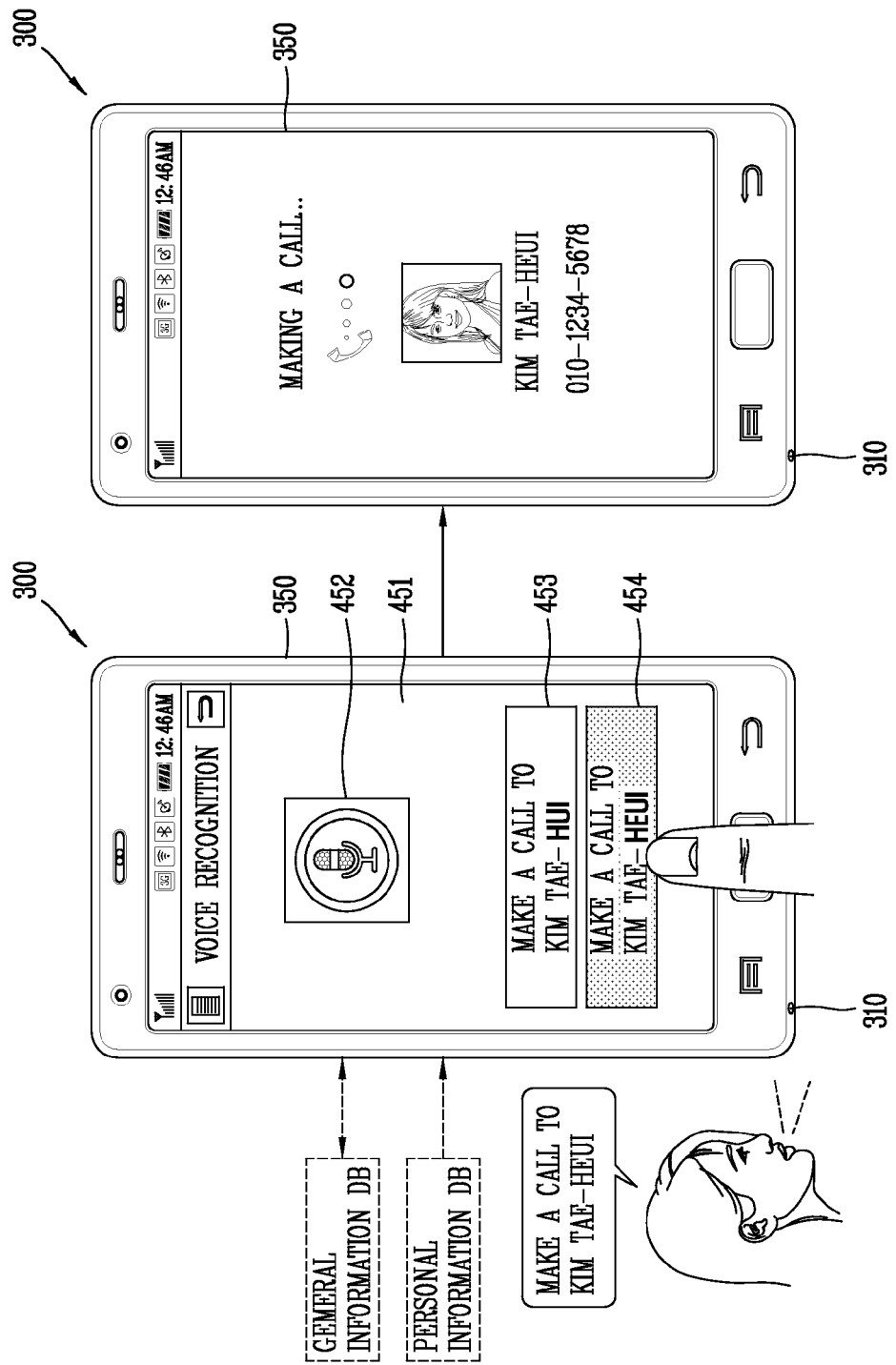
FIG. 10 is a conceptual view illustrating a user interface of a mobile terminal to which the voice recognition method of FIG. 9 is applied.

FIG. 10 is a conceptual view illustrating a user interface of a mobile terminal 300 to which the voice recognition method of FIG. 9 is applied. Referring to FIG. 10, the controller 360 may control the display unit 350 to display a screen image 451 associated with voice recognition. The screen image 451 may include guide information 452, first and second voice recognition data 453, 454, and the like.

For example, as a result of recognizing a voice "Make a call to Kim Tae-Heui" received from the user, first and second voice recognition data 453, 454 in a text form, such as "Make a call to Kim Tae-Hui" and "Make a call to Kim Tae-Heui", may be displayed in a text form. At this time, different characters or words in the first and second voice recognition data 453, 454 may be highlighted. For example, the thickness, color, slope, and font of "Hui" and "Heui" may be changed to be distinguished from the other characters. Otherwise, graphic effects such as underlines, shadows and the like may be provided to "Hui" and "Heui". As a result, the user can intuitively recognize what is voice recognition data more suitable to his or her intention in a relative manner.

The controller 360 may select either one of the first and second voice recognition data 453, 454 in response to a touch input. Furthermore, the controller 360 may estimate and execute a function corresponding to the user's intention based on the selected either one voice recognition data. For example, as the voice recognition data 454 such as "Make a call to Kim Tae-Heui" is recognized, the controller 360 may estimate and execute a phone call function.

According to the present disclosure, among voice recognition results obtained by a remote voice recognition engine (first voice recognition engine) and a local voice recognition engine (second voice recognition engine, which are complementary to each other, a voice recognition result determined to have high reliability by a predetermined algorithm may be selected and used, thereby enhancing a voice recognition rate of the mobile terminal.

Furthermore, according to the present disclosure, when personal information is required for the estimated function during the voice recognition process, a voice recognition result obtained by the local voice recognition engine may be used, thereby preventing a voice associated with personal information from being recognized by the remote voice recognition engine. In other words, it may be possible to prevent personal information from being leaked.

Furthermore, according to the present disclosure, a voice recognition result of the remote voice recognition engine can be ignored during the fault status of a network to remove a delay required to receive a voice recognition result from the remote voice recognition engine, thereby enhancing the processing speed of voice recognition.

According to an embodiment of present disclosure, the foregoing method may be implemented as codes readable by a processor on a medium written by a program. Examples of the processor-readable media may include ROM, RAM, CD-ROM, magnetic tape, floppy disk, and optical data storage device, and the like, and also include a device implemented in the form of a carrier wave (for example, transmission via the Internet).

The configurations and methods according to the above-described embodiments will not be applicable in a limited way to the foregoing mobile terminal, and all or part of each embodiment may be selectively combined and configured to make various modifications thereto.

What is claimed is:

1. A voice recognition method of a mobile terminal in connection with a server, the method comprising:
    receiving a user's voice;
    providing the received voice to a first voice recognition engine provided in the server and a second voice recognition engine provided in the mobile terminal;
    acquiring first voice recognition data as a result of recognizing the received voice by the first voice recognition engine;
    acquiring second voice recognition data as a result of recognizing the received voice by the second voice recognition engine;
    estimating a function corresponding to the user's intention based on at least one of the first and the second voice recognition data;
    calculating a similarity between the first and the second voice recognition data when personal information is required for the estimated function; and
    selecting either one of the first and the second voice recognition data based on the calculated similarity.

2. The method of claim 1, further comprising:
    ignoring the second voice recognition data when personal information is not required for the estimated function.

3. The method of claim 1, wherein said acquiring the first voice recognition data comprises:
    transmitting a request signal for requesting the first voice recognition data to the server; and
    receiving the first voice recognition data from the server in response to the request signal.

4. The method of claim 3, further comprising:
    obtaining the status information of a network connected between the server and the mobile terminal; and
    blocking the reception of the first voice recognition data based on the status information of the network.

5. The method of claim 4, further comprising:
    executing the estimated function using the second voice recognition data when the reception of the first voice recognition data is blocked.

6. The method of claim 1, further comprising:
    displaying a menu button for executing the personal information protection function; and
    blocking the received voice from being provided to the first voice recognition engine when the personal information protection function is executed in response to a touch input to the menu button.

7. The method of claim 1, further comprising:
    executing the estimated function using the selected either one voice recognition data.

8. The method of claim 1, wherein said acquiring the second voice recognition data comprises:
    recognizing the received voice with reference to a database for the personal information.

9. A mobile terminal in connection with a server, comprising:
    a microphone configured to receive a user's voice;
    a communication unit configured to transmit the received voice to the server and receive first voice recognition data generated as a result of recognizing the received voice by a first voice recognition engine provided in the server;
    a second voice recognition engine configured to generate second voice recognition data as a result of recognizing the received voice; and
    a controller configured to estimate a function corresponding to the user's intention based on at least one of the first and the second voice recognition data, and calculate a similarity between the first and the second voice recognition data when personal information is required for the estimated function, and select either one of the first and the second voice recognition data based on the calculated similarity.

10. The mobile terminal of claim 9, wherein the controller ignores the second voice recognition data when personal information is not required for the estimated function.

11. The mobile terminal of claim 9, wherein the controller obtains the status information of a network connected between the server and the mobile terminal, and blocks the reception of the first voice recognition data based on the status information of the network.

12. The mobile terminal of claim 10, wherein the controller executes the estimated function using the second voice recognition data when the reception of the first voice recognition data is blocked.

13. The mobile terminal of claim 9, further comprising:
    a display unit configured to display a menu button for executing the personal information protection function.

14. The mobile terminal of claim 13, wherein the controller blocks the received voice from being provided to the first voice recognition engine when the personal information protection function is executed in response to a touch input to the menu button.

15. The mobile terminal of claim 9, wherein the controller executes the estimated function using the selected either one voice recognition data.

16. The mobile terminal of claim 9, wherein the second voice recognition engine recognizes the received voice with reference to a database for the personal information.

* * * * *